United States Patent [19]

Simpson-Davis et al.

[11] Patent Number: 4,800,260
[45] Date of Patent: Jan. 24, 1989

[54] PORTABLE CARD-LIKE ARTICLE

[75] Inventors: Raymon W. Simpson-Davis, Bishops Waltham; Allan Bennett, East Meon, both of England

[73] Assignee: De La Rue Systems, Limited, England

[21] Appl. No.: 136,376

[22] Filed: Dec. 22, 1987

[30] Foreign Application Priority Data

Dec. 23, 1986 [GB] United Kingdom ............... 8630731

[51] Int. Cl.⁴ .............................................. G06F 19/00
[52] U.S. Cl. ....................................... 235/487; 235/492
[58] Field of Search ................................. 235/487, 492

[56] References Cited

U.S. PATENT DOCUMENTS 4,754,418  6/1988  Hara ............................... 235/487 X Primary Examiner—Harold I. Pitts
Attorney, Agent, or Firm—Ostrolenk, Faber, Gerb & Soffen

[57] ABSTRACT

A portable card-like article having a force sensing assembly for use in a force monitoring system comprises a support (3) to which is pivoted a plate (1) via a pair of laterally spaced arms (2). A pair of leaf springs (4) urge the plate (1) towards a normal, rest position. A Hall effect transducer (8) and permanent magnet (7) are mounted to a base (5) of the assembly and an underside of the plate (1) respectively and sense pivotal movement on the plate (1) due to the action of a writing instrument of the upper surface of the plate. The output signals from the Hall effect transducer (8) provide an indication on the magnitude of the applied force.

7 Claims, 2 Drawing Sheets

PORTABLE CARD-LIKE ARTICLE

FIELD OF THE INVENTION

The invention relates to a portable card-like article, for example a transaction card such as a credit or charge card.

DESCRIPTION OF THE PRIOR ART

Force sensing assemblies such as pressure pads are well known in which a plate member or the like is supported at at least three positions on a base member and the total load applied on the plate member is determined by monitoring the loads at each of the three support positions on flexure of the plate member. Typically, Hall effect devices are provided at each of the three positions. This system requires accurate calibration of each of the Hall effect devices and associated magnets. This type of force sensing assembly has the disadvantage that it is too bulky and complex to incorporate in a portable card-like article.

SUMMARY OF THE INVENTION

In accordance with the present invention, a portable card-like article has a force sensing assembly which comprises a support; a force responsive member pivoted to the support; biassing means for biassing the force responsive member towards a rest position; and sensing means for sensing pivotal movement of the force responsive member against the bias in response to an applied force.

This assembly considerably simplifies the known arrangements by providing a pivoted force responsive member instead of making use of a member which flexes in response to an applied force. This results in the possibility of using a single sensor, such as a Hall effect transducer, to monitor the magnitude of an applied load.

The invention thus provides a self-contained assembly particularly for use in signature verification.

Preferably, the force responsive member is pivoted to the support by at least one arm extending from the support to the force responsive member.

The biasing means may be provided by any convenient resilient member but conveniently comprises one or more leaf springs.

Typically the force sensing assembly forms part of a force monitoring system which further comprises processing means responsive to signals generated by the sensing means to monitor the magnitude of a force applied on the force responsive member.

One problem which can occur with certain sensing devices such as Hall effect transducers is the generation of second order non-linear effects due to variations in temperature and the like.

To deal with this problem the article preferably further comprises a compensation circuit for connection to a Hall effect transducer adapted to monitor variations in magnetic flux, the circuit comprising subtraction means for subtracting an offset signal from the output signal of the transducer; and offset signal generating means operable during an idle mode in which the magnetic flux is substantially constant to monitor the output of the transducer and to generate the offset signal related to that output, and operable in a working mode to supply the previously generated offset signal to the subtraction means.

Thus, the processing means may be operable in a first mode, when no force is applied to the force responsive member, to monitor the output of the sensing means to generate correction data, and in a second mode to correct the output of the sensing means with the previously determined correction data and subsequently to generate a signal related to the magnitude of the applied force.

Typically, in the case of a signature verification system, the processing means may operate in the first mode between the writing of signatures.

"Portable" in the context of the invention refers to an article which may be easily carried by the user such as in a trouser or jacket pocket, or a wallet.

BRIEF DESCRIPTION OF THE DRAWINGS

An example of a portable card-like article having a force monitoring system incorporating a force sensing assembly according to the invention will now be described with reference to the accompanying drawings, in which:-

DETAILED DESCRIPTION OF AN EMBODIMENT

Figure 2:
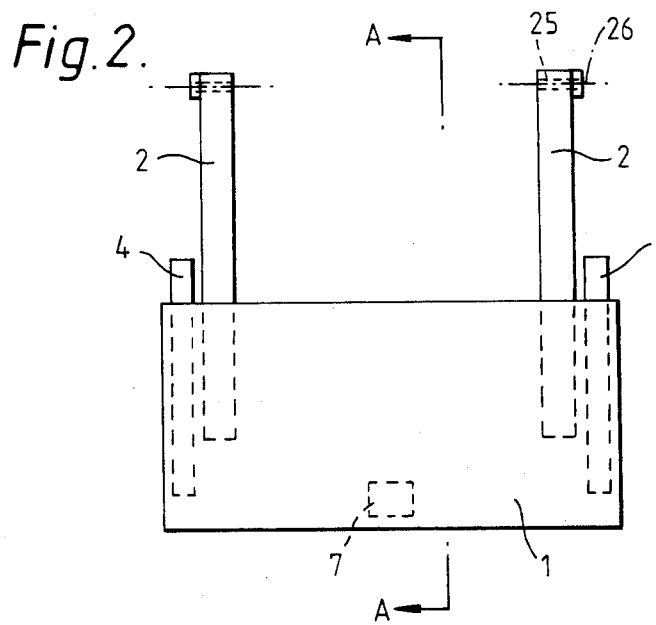
FIG. 2 is a schematic plan of the force sensing assembly.
Figure 3:
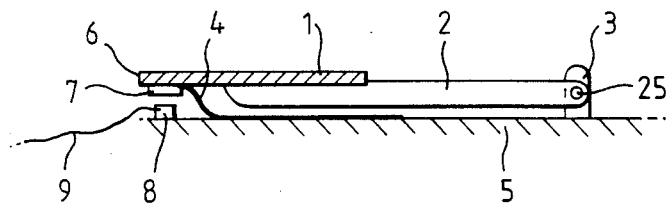
FIG. 3 is a section taken of the line A—A in FIG. 2.

The assembly shown in FIGS. 2 and 3 comprises a pressure plate 1 fixed to a pair of laterally spaced arms 2 which extend from beneath the plate 1 to a support 3 to which they are hinged. The plate is thus pivotable about the hinges 25. The plate 1 is biassed towards its rest position shown in FIG. 3 by a pair of laterally spaced leaf springs 4 bonded at one end to an undersurface of the plate 1 and at their other ends to a base 5 of the assembly.

In use, a writing instrument is pressed onto the upper surface of the plate 1 causing the plate 1 to pivot about the hinge line 26 and thus causing a free end 6 of the plate 1 to move towards the base 5.

A permanent magnet 7 is bonded to the undersurface of the plate 1 in alignment with a Hall effect transducer 8 mounted on the base 5. Thus, as the plate 1 pivots towards the base 5, the Hall effect transducer will experience a variation in magnetic field due to movement of the magnet 7. This variation is converted in a known manner to corresponding electrical signals fed along lines 9 to processing circuitry shown in FIG. 1.

The magnet 7 may be of any convenient type but advantageously is formed from plastic or rubber sheet since this gives the benefits of very low cost and ease of assembly.

It is important to note that the assembly is used soley for monitoring the magnitude of the applied force and not for determining the position of the force. This feature enables a single Hall effect transducer to be sufficient.

The transducer 8 is powered from a power supply (not shown) which need not be particularly accurate because of the autocompensation technique to be described. A value of about 3-5v is suitable.

The degree of deflection of the magnet 7 towards the transducer 8 will typically be small and in the case where the assembly is incorporated into a credit card sized unit, a value of from 0.1–0.5 mm is typical. The signal output from the transducer 8 is in the order of tens of millivolts and is fed to the non-inverting input of an operational amplifier 10 which provides sufficient gain to scale the signal to a level suitable for an analogue to digital converter 11.

The A/D converter 11 is controlled via a bus 15 by a microcomputer 12 and generates an 8 bit version of the input analogue signal. The 8 bit output is fed to a store 13 connected to a digital to analogue converter 14.

The input frequency from the transducer 8 (resulting from the application of a writing instrument on the plate 1) is typically in the range of 2–12 Hz. The speed of the A/D converter 11 is therefore not critical and could be as low as 500 Hz or less. This would conserve power consumption if the circuitry were composed of CMOS type technology.

In theory, the output from the A/D converter 11 is directly related to the magnitude of the applied force. However, one problem inherent in Hall effect devices is the offset which is present on the output signal. This is nominally one half of the supply voltage but is affected by temperature, manufacturer's tolerances, and the static level of flux density from the magnet 7. The usual methods of eliminating offset in general transducer amplifications requires trimming with a potentiometer or including a band pass filter. Neither type is suitable for the small scale (credit card) size applications envisaged. The low frequency pass band in the filter, in this case, would require relatively large capacitors.

Instead, we provide a technique which continuously samples the output signal from the transducer 8 during inactive periods when no force is applied to the plate 1. In the case of signature verification, this will be the period between the writing of signatures.

To determine the offset, the microcomputer 12 controls a switch 16 via the control bus 15. When the assembly is not being used, the switch 16 is closed and the system enters the auto-null condition. In this condition, the output from the A/C converter 11 is stored in the store 13 and then converted by the D to A converter 14. The analogue output from the converter 14 is rescaled by a scaling circuit 17 so as to be compatible with the signal from the Hall effect transducer 8 and is fed to the inverting input of the amplifier 10. Thus, a feedback circuit is provided so that the contents from the store 13 are continuously updated with the inactive output of the transducer 8.

When a signature is to be written, the microcomputer 12 opens the switch 16 so that a steady state voltage corresponding to the latest offset value in the store 13 is applied to the inverting input of the operational amplifier 10. This offset is then subtracted from the incoming signals from the transducer 8 so as automatically to null changes in flux density, temperature etc unrelated to the magnitude of the applied force. Once the signature has been completed, the microcomputer 12 causes the switch 16 to close and the system returns to the auto-null condition. For applications in which the circuitry is embodied within a credit card sized article, the electronic circuit shown in FIG. 1 would be fabricated in a technology generally known as gate arrays. The circuit could also be manufactured in thick film technology. It is envisaged that, for volume production, the system would be designed as a "full custom integrated circuit".

Figure 4:
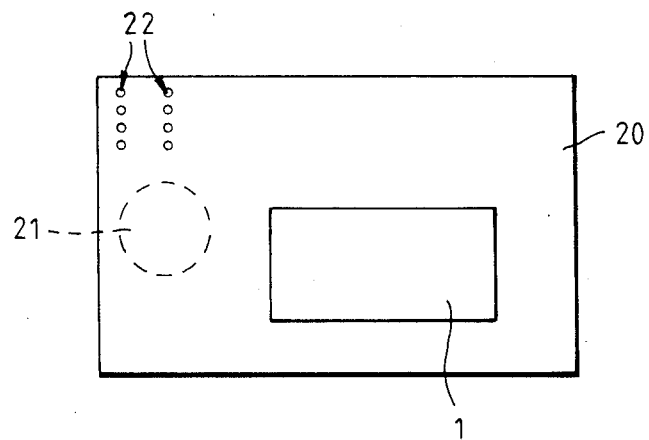
FIG. 4 is a schematic drawing of a portable card containing a microprocessor and incorporating the force sensing assembly described in FIGS. 2 and 3.

FIG. 4 shows a credit card sized article 20 incorporating a pressure plate 1, with the remainder of the sensing assembly shown in FIGS. 2 and 3 located within the card 20.

Figure 1:
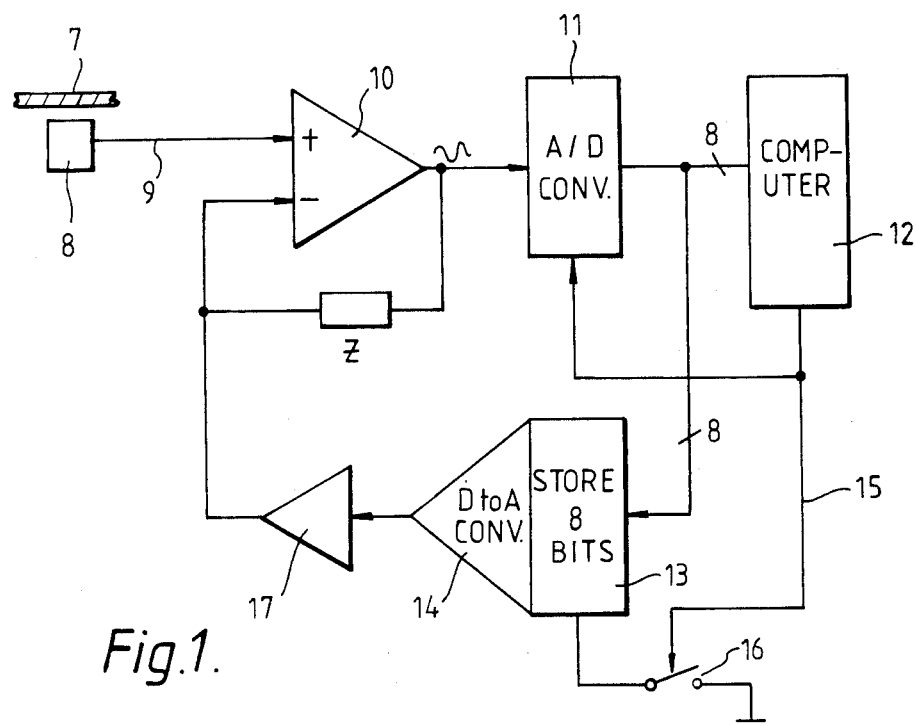
FIG. 1 is a block diagram of the force monitoring system with details of the force sensing assembly omitted for clarity.

The card 20 also incorporates a microprocessor 21 which contains the force monitoring circuitry shown in FIG. 1 and electrical contacts 22 to enable the microprocessor 21 to communicate with an appropriate card terminal (not shown).

We claim:

1. A portable card-like article having a force sensing assembly which comprises a support; a force responsive member pivoted to said support; biassing means for biassing said force responsive member towards a rest position; and sensing means for sensing pivotal movement of said force responsive member against said bias in response to an applied force.

2. An article according to claim 1, wherein said sensing means comprises a cooperating magnet and Hall effect transducer, one of which is mounted for movement with said force responsive member and said other of which is stationary with respect to the force responsive member.

3. An article according to claim 1, further comprising at least one arm, wherein said force responsive member is pivoted to said support by said at least one arm extending from the support to the force responsive member.

4. An article according to claim 1, wherein said biassing means comprises at least one leaf spring.

5. A portable card-like article according to claim 1, wherein said force sensing assembly forms part of a force monitoring system which further comprises processing means responsive to signals generated by said sensing means to monitor the magnitude of a force applied on said force responsive member.

6. An article according to claim 5, wherein said processing means is operable in a first mode, when no force is applied to said force responsive member, to monitor the output of said sensing means to generate correction data, and in a second mode to correct the output of said sensing means with the previously determined correction data and subsequently to generate a signal related to the magnitude of said applied force.

7. A portable card-like article according to claim 1, further comprising a compensation circuit for connection to a Hall effect transducer adapted to monitor variations in magnetic flux, said circuit comprising subtraction means for subtracting an offset signal from the output signal of said transducer; and offset signal generating means operable during an idle mode in which the magnetic flux is substantially constant to monitor said output of the transducer and to generate said offset signal related to that output, and operable in a working mode to supply said previously generated offset signal to said subtraction means.

* * * * *